UNITED STATES PATENT OFFICE.

ERNST BLOCH, OF BASEL, SWITZERLAND.

BENZOYL-SALICYLIC ACID AND PROCESS OF MAKING SAME.

No. 799,706.     Specification of Letters Patent.     Patented Sept. 19, 1905.

Application filed May 26, 1905. Serial No. 262,479.

*To all whom it may concern:*

Be it known that I, ERNST BLOCH, pharmaceutical chemist, a citizen of the Swiss Republic, residing at Basel, Switzerland, have invented a certain new and useful Process of the Manufacture of Benzoyl-Salicylic Acid, of which the following is a specification.

According to Gerhardt (*Ann. der Chemie*, Vol. 87, page 161) the action of benzoyl-chlorid on sodium salicylate yields a compound of the formula $$(C_6H_4.OH)CO-O-CO.C_6H_5,$$

which is a flexible and viscous mass, difficult to purify, and capable of being split up easily into benzoic acid and salicylic acid by boiling with water. On the other hand, Limpricht (*Annalen der Chemie*, Vol. 290, page 164) has reported on a compound of the formula

which he called "benzoyl-salicylic" acid, but which contains the benzoyl group in the benzene nucleus and consequently a non-esterified hydroxyl group. An ester of benzoyl-salicylic acid has been produced by Freer from dry sodium-salicylic ethyl-ether, (*Journal für Praktische Chemie, N. F.*, Vol. 47, page 243.) On saponification this ester,

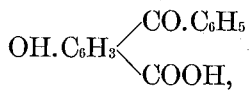

is, however, split up into benzoic acid and salicylic acid. Consequently it has not been found possible hitherto to produce free benzoyl-salicylic acid or its salts.

According to the present invention true benzoyl-salicylic acid,

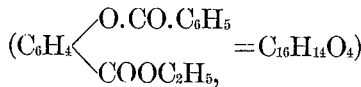

or, strictly speaking, its sodium salt, is obtained by causing benzoyl-chlorid to act on disodium salicylate diluted with benzin, ether, or a similar liquid, provided that the benzoyl-chlorid is employed in molecular quantity or in slight excess, and high temperatures are avoided.

The following example serves to show the details of procedure: 18.2 kilograms of disodium salicylate, obtained by dissolving salicylic acid in sodium hydrate in the proportion of one molecule of salicylic acid to two molecules of sodium hydrate and the necessary quantity of water and evaporating to dryness, are formed into a thin paste by adding about twenty kilos of benzin, (petroleum spirit,) after which a mixture of 14.1 kilos of benzoyl-chlorid and twenty kilos of benzin are poured over it in a receptacle provided with a reflux cooler and a stirrer, and the at first violent reaction is moderated by cooling, if necessary. Subsequently about sixteen kilos of benzin are added, and the agitator is kept in motion for about eight hours. The product of the reaction is separated from the benzin by filtration. Any remnant of unaltered benzoyl-chlorid is removed by subsequent washing with benzin. The product of the reaction is dried and then boiled with about twenty-five times its quantity of water, thereby causing benzoyl-salicylate of sodium, salicylate of sodium, and sodium-chlorid to enter into solution. The cooled and, if necessary, filtered solution, which has a slightly-acid reaction, is precipitated by means of acetic acid or a similarly-acting acid. On stirring the free benzoyl-salicylic acid separates out in a crystalline form. To relieve this acid from salicylic acid adhering to the same, it is recrystallized from dilute alcohol or precipitated from its alcoholic solution by a sufficient quantity of water.

Benzoyl-salicylic acid is almost insoluble in cold water, sparingly soluble in hot water, easily soluble in ether, alcohol, and chloroform, and not soluble in petroleum spirit.

The acid crystallized from alcohol melts at 132°. In aqueous solution containing alcohol it does not produce the chemical reaction characteristic of salicylic acid; but when boiled with alkalies it splits up rapidly into salicylic acid and benzoic acid, after which the presence of the former can be proved by means of chlorid of iron.

Benzoyl-salicylic acid is intended to be used for therapeutic purposes, either as such or in the shape of salts, esters, or other compounds.

What I claim is—

1. The process for the manufacture of benzoyl-salicylic acid, which consists in treating disodium salicylate with benzoyl-chlorid, after dilution with a suitable liquid, and separating the free acid from the sodium benzoyl-salicylate resulting from the reaction, substantially as described.

2. The process for the manufacture of benzoyl-salicylic acid, which consists in treating disodium salicylate with benzoyl-chlorid, after dilution with ether, and separating the free acid from the sodium benzoyl-salicylate thus obtained, by means of a suitable acid, substantially as described.

3. The process for the manufacture of benzoyl-salicylic acid, which consists in treating disodium salicylate with the molecular quantity of benzoyl-chlorid, after dilution with ether, and separating the free acid from the sodium benzoyl-salicylate thus obtained, by means of acetic acid, substantially as described.

4. As a new article of manufacture, benzoyl-salicylic acid, which is sparingly soluble in water, easily soluble in ether, alcohol and chloroform, melting (after having been crystallized from alcohol) at 132° centigrade, capable of being split up into salicylic acid and benzoic acid by boiling with alkali, and obtainable by the process described.

In witness whereof I have set my hand hereunto in the presence of two subscribing witnesses.

ERNST BLOCH.

Witnesses:
 GEO. GIFFORD,
 ALBERT GRAETER.